United States Patent
Collier et al.

(10) Patent No.: US 6,331,497 B1
(45) Date of Patent: Dec. 18, 2001

(54) POLYCRYSTALLINE CUBIC BORON NITRIDE CUTTING TOOL

(75) Inventors: Matthew W. Collier, Draper; Xian Yao, Sandy; Brian G. Bowers, Payson, all of UT (US)

(73) Assignee: Smith International, Inc., Houston, TX (US)

( * ) Notice: Subject to any disclaimer, the term of this patent is extended or adjusted under 35 U.S.C. 154(b) by 0 days.

(21) Appl. No.: 09/514,476

(22) Filed: Feb. 28, 2000

Related U.S. Application Data

(63) Continuation-in-part of application No. 09/361,846, filed on Jul. 27, 1999, now Pat. No. 6,140,262.

(51) Int. Cl.$^7$ .................. C04B 35/5831; C04B 35/5835
(52) U.S. Cl. ......................... 501/96.4; 501/87; 501/92; 501/96.1; 407/119
(58) Field of Search ............ 501/87, 96.1, 96.4, 501/96.3, 92; 407/119

(56) References Cited

U.S. PATENT DOCUMENTS

| | | | |
|---|---|---|---|
| 4,647,546 | 3/1987 | Hall, Jr. et al. | 501/96 |
| 4,650,776 | 3/1987 | Cerceau et al. | 501/96 |
| 5,200,372 * | 4/1993 | Kuroyama et al. | 501/96.4 |
| 5,271,749 | 12/1993 | Rai et al. | 51/293 |
| 5,326,380 | 7/1994 | Yao et al. | 51/293 |
| 5,569,862 * | 10/1996 | Kuroyama et al. | 501/96.4 |
| 5,639,285 | 6/1997 | Yao et al. | 51/307 |
| 5,697,994 | 12/1997 | Packer et al. | 51/309 |
| 5,830,813 * | 11/1998 | Yao et al. | 501/87 |
| 6,001,757 * | 12/1999 | Fukaya et al. | 501/96.4 |
| 6,001,758 * | 12/1999 | Fukaya et al. | 501/96.4 |
| 6,008,153 * | 12/1999 | Kukino et al. | 501/96.4 |

FOREIGN PATENT DOCUMENTS 0839776  5/1998  (EP).

* cited by examiner

*Primary Examiner*—Karl Group
(74) *Attorney, Agent, or Firm*—Christie, Parker & Hale, LLP

(57) ABSTRACT

The polycrystalline cubic baron nitride cutting tool has a particle size in the range of from 10–17 microns. In addition to CBN, the tool has from 2%–15% by weight of a refractory compound selected from the group consisting of titanium carbonitride, titanium aluminum carbonitride, titanium carbide, titanium nitride, titanium diboride and aluminum diboride. When using one of the carbonitrides, the carbon to nitrogen proportion is preferably in the range of from 30 atomic percent carbon and 70 atomic percent carbon to 70 atomic percent carbon and 30 atomic percent nitrogen, and preferably is about 50/50. In addition, there is an infiltrate containing aluminum and/or silicon. A quantity of diamond crystals more than stoichiometric with the amount of silicon infiltrated is included in the composition for forming silicon carbide. The cutting tool is not formed on a cemented tungsten carbide substrate so is substantially free of cobalt.

30 Claims, No Drawings

POLYCRYSTALLINE CUBIC BORON NITRIDE CUTTING TOOL

This application is a continuation in part of U.S. patent application Ser. No. 09/361,846, filed Jul. 27, 1999, now U.S. Pat. No. 6,140,262. The subject matter of this application is hereby incorporated by reference.

BACKGROUND

This invention concerns a tool fabricated of polycrystalline cubic boron nitride (PCBN or CBN) for machining ferrous metals.

Cubic boron nitride is a superhard material in the same class as diamond although not quite as hard as diamond. Diamond can be used for machining many materials because of its great hardness. It is not generally considered suitable for high speed machining of ferrous metals since iron catalyzes decomposition of diamond at elevated temperatures and there is, in effect, a chemical decomposition or erosion of the diamond. CBN is not as susceptible to thermal decomposition by iron and is, therefore, suitable for some machining of ferrous metal where diamond cannot be used.

A PCBN cutting tool may be formed by high temperature, high pressure processing on a cemented tungsten carbide substrata. In such a tool, the polycrystalline CBN is infiltrated with cobalt. This invention concerns a different type of CBN cutting tool where the body of PCBN is "solid" or "unsupported" and substantially free of infiltrated cobalt. In other words, a blank of PCBN is made by high temperature, high pressure processing without a carbide substrate. An unsupported PCBN cutting tool is formed from the starting powders and usually infiltrated or mixed with aluminum and/or silicon. The resulting blank is cut and ground to a desired tool shape. The tool is clamped in a tool holder for a lathe for example. Such a CBN cutting tool is described in the context of machining cast iron, but it may also be used for other ferrous or non-ferrous metals, or for non-metallic work pieces.

A CBN cutting tool is still subject to erosion or wear and requires chemical and thermal resistance for optimizing the cutting rate on a workpiece and the lifetime of the tool.

A few manufacturers have PCBN cutting tools in the marketplace. One such cutting tool marketed by Megadiamond is made from a mixture of grain sizes of CBN particles, a small amount of diamond particles and is infiltrated with an aluminum-silicon eutectic alloy as a sintering catalyst.

It is common to define the composition of the tool after high temperature, high pressure processing by the ingredients used to make the tool. This is because the processed tool may end up with CBN with an apparent particle size that is different from the particle size of the initial ingredients, but very hard to measure. Similarly, an infiltrate containing aluminum and silicon ends up as a complex mixture of aluminum nitride, silicon nitride, silicon carbide, aluminum oxide and/or silicon oxide, which are quite difficult to distinguish from each other. These compounds may collectively be referred to simply as a second phase.

The exemplary Megadiamond PCBN composition comprises about 80% (by weight) of 22 to 36 micron CBN, about 10% 12 to 22 micron CBN, about 7% CBN with smaller particle sizes and about 3% fine diamond crystals. The composition is infiltrated with a eutectic aluminum-silicon alloy (about 88% by weight aluminum and 12% silicon).

It may be noted that the particle size ranges are so-called particle size "cuts" as specified by CBN suppliers. The actual particle size in a specific cut tends to be somewhat smaller than the ends of the ranges stated for the cut, and the particle size distribution tends to be skewed toward the smaller particle sizes. Thus, for example, a 12 to 22 micron cut from one CBN vendor has actual particle sizes between about 10 and 17 microns and an average particle size of about 13 microns (average particle size is 50% by volume or mass). Furthermore, the cuts are defined such that the particle sizes are the 90% values. In other words, at least 90% of the particles are larger than the lower limit and at least 90% are smaller than the upper limit. Larger particles are not common. "Fines" (small particles) are often seen in cuts with larger particle sizes.

It is recognized by those skilled in working with these small particle size materials that particle size is not an exact science and involves some degree of approximation when defining the particle size. It is also recognized that the original starting material particle size can be roughly estimated from the particle size seen upon microscopic examination of a finished product.

The PCBN cutting tools involved in practice of this invention approach 100% CBN (e.g. 95% CBN, 5% TiCN as feed material). There are other compositions employed for other machining tasks having lower proportions of CBN and additional ingredients. Such compositions are shown, for example, in U.S. Pat. Nos. 4,647,546; 4,650,776; 5,271,749; 5,326,380; 5,639,285 and 5,697,994.

Both General Electric Company and DeBeers have solid or unsupported, approximately 100% PCBN cutting tools in the marketplace. A General Electric material known as BZN7000S appears to have a CBN particle size implying primarily an 8–12 micron cut. A material available from DeBeers known as Amborite appears to employ a similar particle size cut, 8 to 12 microns. A PCBN material marketed by Seco as SECO 300 is similar, but has a slightly larger CBN particle size. Both of these materials include aluminum nitride and in addition the General Electric material appears to include silicon and/or a silicon compound as a catalyst.

Showa Denko has commercially available solid or unsupported PCBN cutting tools identified as KS-10 and KS-25. Examination of these materials indicates that KS-10 has approximately 80% CBN and 20% TiN. KS-25 appears to have 60% CBN and 40% TiN. Both include AlN. The average grain size of the CBN in both products is no more than about five microns.

As is often desirable, improved performance in service is a goal of development efforts. Thus, it is desirable to have a PCBN cutting tool which lasts longer and/or has a higher production rate.

BRIEF SUMMARY OF THE INVENTION

There is therefore provided in practice of this invention according to a presently preferred embodiment, a CBN cutting tool made from cubic boron nitride having a crystal size in the range of from about 10 to 17 microns and including in the range of from 2 to 15% by weight of a material selected from the group of refractory compounds consisting of titanium diboride, aluminum diboride, titanium carbide, titanium nitride, titanium carbonitride, and titanium aluminum carbonitride. The carbonitride system encompasses a range of compositions from titanium nitride to titanium carbide. Preferably, the carbonitride has a carbon to nitrogen proportion in the range of from 20 atomic percent carbon and 70 atomic percent nitrogen to 70 atomic percent carbon and 30 atomic percent nitrogen. The mixture of CBN and refractory compound is infiltrated with aluminum and/or silicon, preferably a eutectic composition of silicon and aluminum. Desirably, a quantity of, carbon more than stoichiometric with the amount of silicon infiltrated is included in the composition for forming silicon carbide.

DESCRIPTION

A PCBN cutting tool is made by conventional high temperature, high pressure processing in a large press. The powder ingredients are mixed, typically by tumbling in a Tubula mixer. Cemented tungsten carbide balls may be included to break. up agglomerations and help assure a uniform mixture. Preferably the mixing with carbide balls is low energy and for a short time for minimizing accumulation of contaminants and reduction of particle size. The mixed powders are placed adjacent to a disk of infiltrate such as aluminum, silicon or an aluminum-silicon alloy, typically in a "can" of high melting metal, such as niobium and/or tantalum. This assembly is placed in a high pressure press, pressurized to at least a pressure where cubic boron nitride is thermodynamically stable, and heated to a sufficient temperature to melt the infiltrate and form polycrystalline cubic boron nitride.

Sometimes the powder mixture may include a source of aluminum such as aluminum powder or aluminum nitride, and there is less reliance on infiltration from an adjacent body containing aluminum.

In a typical process, tool blanks made in this manner have a diameter from 25–50 millimeters and thickness of from 2–8 millimeters. Cutting tools are cut from such blanks by laser cutting and the tools are finish ground by diamond grinding. A variety of tool geometries are employed for various machining operations including square, triangular, circular and semi-circular. An exemplary tool may be 16 mm square and 4 mm thick. Neither the shape of the tool nor the process steps for making PCBN blanks are unique in practice of this invention.

The CBN used in practice of this invention is substantially 100% a 12–22 micron cut. Examination indicates that the particles have a size in the range of from 10 to 17 micrometers and an average particle size of about 13 micrometers. Some particles of smaller crystal size are present in the composition and some smaller particle sizes may be added, up to about 5% by weight, without significantly diminishing the advantages achieved by the cutting tool.

The mixture also includes from 2 to 15% by weight of a high melting point, stable compound, including titanium diboride, aluminum diboride, titanium carbide, titanium nitride, titanium carbonitride or titanium aluminum carbonitride. When the refractory compound comprises titanium aluminum carbonitride, the aluminum is present up to about 30 atomic percent of the total metal (titanium plus aluminum). Preferably, the amount of titanium carbide, titanium nitride, titanium diboride, aluminum diboride, TiCN or TiAlCN in the PCBN cutting tool is less than 10% by weight and most preferably about 5%. A large amount of TiCN or the like may unduly soften the PCBN cutting tool and decrease its useful lifetime for some machining operations. A particularly desirable composition comprises 95% by weight CBN and 5% by weight TiCN.

Other related refractory carbonitrides may be used to impart desirable properties to the PCBN without significantly degrading its hardness. Suitable refractory compounds may be defined as $(Ti_xM_y)CN$. The alloying element M may be one or more of aluminum, silicon, chromium, cobalt, tungsten and tantalum with aluminum, silicon, tungsten and tantalum being preferred and aluminum being particularly preferred. When the refractory material is titanium carbonitride, y (or y/x) is zero. Otherwise the proportion of alloying metal to titanium, y/x, is in the range of from 0.05 to 0.3. Instead of adding carbonitrides, for example, as a separate powder, one may coat CBN particles with such materials. Furthermore, one may add carbide forming materials (e.g. metal or a compound with favorable free energy of formation) and a source of carbon for forming carbides or carbonitrides in situ. Titanium carbonitride and titanium aluminum carbonitride powders are preferred materials for enhanced chemical wear resistance and toughness obtained by the refractory compounds.

The TiCN (or other refractory compound) has an average particle size appreciably smaller than the average particle size of the CBN cut so that it is finely dispersed in the mixture and in the processed tool. A preferred refractory compound average particle size is about 1.5 micrometers. The average particle size is preferably less than about ⅓ of the average particle size of the CBN cut. With such a small particle size, separate identification of TICN in the processed tool is somewhat difficult.

The carbonitrides (e.g. TiCN and TiAlCN) have a variable rather than a stoichiometric composition. TiN and TiC are mutually soluble in each other. Thus, TiCN may have anywhere from a very low to a very high proportion of carbon to nitrogen. Preferably the TiCN (or TiAlCN) has a carbon to nitrogen proportion in the range of from 30 atomic percent carbon and 70 atomic percent nitrogen to 70 atomic percent carbon and 30 atomic percent nitrogen. The 50/50 proportion of carbon to nitrogen is particularly preferred.

When the proportion of carbon to nitrogen is high in the TiCN, the Cutting tool may be somewhat more brittle and subject to flaking or cracking. The material is, however, somewhat harder. On the other hand, when the proportion of nitrogen relative to carbon is high, there is a decrease in hardness of the PCBN composition. The higher proportion of nitrogen, however, contributes greater chemical stability. Thus, there is an opportunity to adjust the properties of the cutting tool by varying the carbon to nitrogen proportion to produce a cutting tool having properties suitable for a particular machining job. As suggested above, a 50/50 proportion of carbon to nitrogen is found to be quite satisfactory for dry cutting of cast iron with a deep cut and high cutting rate. Such a cutting tool has good chemical and thermal properties an shows excellent wear resistance, even though it becomes quite hot during use.

It is believed that a reason for this is that TiCN is thermally more stable than aluminum nitride (AlN) and silicon nitride ($Si_3N_4$). The refractory compounds are noticeably harder than either aluminum nitride or silicon nitride. Thus, they minimize chemical breakdown in the cutting tool, protecting the silicon nitride and aluminum nitride present in the second phase.

It is desirable that the proportion of fine CBN particles; be minimized since good packing density is obtained with the 10–17 micrometer particles (with the inherently present fines in the 12–22 micron cut and the dynamic breakdown of the large particles during the high pressure sintering process). In other words, addition of CBN fine particles is not needed to obtain a high CBN density. When there is a high proportion of smaller particles of CBN in the composition, there is a larger surface area of contact between CBN and the second phase. Such a contact area, in effect, introduces weak platen in the tool and is preferably minimized. The presence of relatively fine TICN (or the like) in the composition is a desirable substitution for fine particles of CBN. The refractory compound in the composition helps protect the CBN directly by being present in the grain boundaries at the second phase.

As far as is known, all commercial compositions of PCBN used as an unsupported cutting tool include aluminum nitride in a second phase. Aluminum is employed during pressing to react with oxides that may be present on the surface of CBN. The aluminum may be derived from aluminum metal, aluminum compounds or aluminum alloys. Aluminum may be introduced in the mixture or may infiltrate from a wafer melted in the high temperature, high pressure processing. Some compositions may also include silicon. In practice of this invention it ig preferred to infiltrate the CBN/TiCN mixture with a eutectic alloy of silicon and aluminum having about 12% silicon and 88% aluminum by weight. Preferably, infiltration is from a disk of aluminum, silicon or aluminum-silicon alloy adjacent to a powder mixture of CBN and TiCN, for example. Alternatively, these materials may be provided in powder form and mixed with the other powders. Another technique is to melt the "infiltrant" with the TICN, for example, crush the resulting composite and mix this with the CBN powder. Particles of TiCN and/or CBN may be coated with the "infiltrant" before mixing. Liquid phase infiltration from an adjacent disk is preferred for highest density of CBN in the tool blanks.

When aluminum and/or silicon infiltrate into the composition containing CBN and TiCN, the amount of infiltrant in the cutting tool appears to be in the range from around 2%–10% by volume. This is estimated from an examination of the microstructure. The infiltrant typically does not appear in its original form in the final product. Thus, with an aluminum-silicon alloy infiltrant, the final product may include a phase surrounding CBN which includes AlN, $AlB_2$, $Al_2O_3$, SiC, $SiO_2$ and other compounds.

One may also include a thin layer of a thermally and chemically stable refractory material adjacent to the CBN mixture, such as between the infiltrant disk and the CBN or on the opposite side from the infiltrant disk, in the high temperature, high pressure press. Such a layer may be on either face if the "infiltrant" is included as a powder mixed with the CBN and refractory metal powders. When this is processed, a layer of such material is metallurgically and chemically bonded to the PCBN. Suitable refractory materials include TiC, TiN, TiCN, TiAlN, TiAlCN and the like. Thickness of such a layer may be up to about 50 microns or more after the cutting tool is lapped to its final thickness. This layer helps delay or prevent the onset of diffusion between the CBN cutting tool and the workpiece material being cut by the cutting tool. A layer of such material may also be added to finished PCBN blanks (or finished cutting tools) by conventional chemical vapor deposition or plasma vapor deposition processes. However, when the layer of material is adhered to a finished PCBN blank or finished cutting tool, a metallurgical bond is not achieved between the PCBN and the layer of material.

It is found desirable to include carbon, preferably in the form of diamond, in the composition for reaction with silicon infiltrated into the powder mixture. Inclusion of diamond particles in the mixture increases the yield of sound blanks from the pressing process. It is believed that the carbon reacts with silicon so that little if any free silicon or silicon oxide remains in the blanks. Silicon carbide is harder and stronger than silicon and has a lower coefficient of thermal expansion. It has a zinc blende type of crystal structure instead of the complex polymorphic forms of silicon oxide. These properties limit the amount of cracking that may occur in the blanks.

Preferably, the carbon is present in the form of diamond crystals having an average particle size in the range of from about 0.5 to 1 microns. The quantity of carbon is more than stoichiometric with the amount of silicon infiltrated into the powder mixture for forming silicon carbide. Perfect distribution of diamond particles in the particle mixture is probably not feasible for full stoichiometric reaction with the infiltrated silicon. Furthermore, reaction occurs at the surfaces of the diamond particles or agglomerates of fine diamond particles, and a core, even of the small particles used, may remain unreacted. Thus, an excess of diamond particles is preferred to assure that all or almost all of the silicon is reacted to silicon carbide.

Preferably, the amount of carbon is about 2 to 2.5 times the amount that would be stoichiometric with the silicon. A small excess of hard diamond particles should not degrade the properties of the composite. Preferably, diamond is present in the composite in the range of from 0.5 to 5% by weight of the powder mixture.

In a specific example, the carbon is present as diamond particles having an average particle size in the range of from 0.5 to 1 micron and in an amount of 2% of the powder mixture. The rest of the mixture comprises about 93% 12–22 micron CBN and 5% 1.4 micron TiCN.

Although preferably in the form of diamond so that an oversupply of carbon does not soften the composite, carbon may also be included as graphite, amorphous carbon or the wurzitic crystal structure. The carbon may also be deposited on surfaces of CBN, for example, as amorphous carbon or as a thin film of vapor deposited diamond.

In one cutting test of white cast iron, a new material comprising 95% PCBN having a particle size of ten to seventeen microns and average particle size of about 12.6 microns, and 5% TiCN having an average particle size of about 1.4 microns, infiltrated with an aluminum-silicon eutectic as described above showed more than double the performance of the previous Megadiamond PCBN material. In another test in white cast iron using aggressive cutting, the new material as described herein showed four times the performance as compared with the previous Megadiamond CBN material. In another test on cast iron rolls, the previous Megadiamond material showed a performance increase of more than 3 times as compared with the Seco material SECO 300 and the new material was 3 times better than the previous Megadiamond material.

Although defined as a "cutting" tool for machining metals the definition should be considered to encompass another application where thermal and chemical stability are important in metal working. The "cutting tool" should be considered to include a wire drawing die, particularly useful for drawing steel wire. In such an application there is sliding contact between the wire and the die surface and the metal is deformed, albeit without removal from the principal body of metal. High temperatures at the die-wire interface may cause chemical erosion of the die surface and a composition as described above can provide prolonged life of the die.

What is claimed is:

1. A CBN cutting tool comprising a body of polycrystalline cubic boron nitride having a crystal size in the range of from 10 to 17 micrometers comprising:

in the range of from 2 to 15% by weight of a material selected from the group of refractory compounds consisting of titanium diboride, aluminum diboride, titanium carbide, titanium nitride, titanium carbonitride, titanium aluminum carbonitride, and $(Ti_xM_y)CN$, wherein the alloying metal M may be one or more of silicon, chromium, cobalt, tungsten and tantalum and the proportion of alloying metal to titanium, y/x, is in the range of from 0.05 to 0.3, the carbonitrides having a carbon to nitrogen proportion in the range of from 30 atomic percent carbon and 70 atomic percent nitrogen to 70 atomic percent carbon and 30 atomic percent nitrogen;

an infiltrant containing aluminum and/or silicon;

diamond more than stoihiometric with the silicon in the infiltrant for forming silicon carbide; and a balance of substantially CBN.

2. A CBN cutting tool according to claim 1 wherein the refractory compound is present in the range of from 3 to 10% by weight.

3. A CBN cutting tool according to claim 1 wherein the amount of refractory compound is 5% by weight.

4. A CBN cutting tool according to claim 1 wherein the refractory compound is titanium carbonitride.

5. A CBN cutting tool according to claim 1 wherein the refractory compound has an average particle size less than 1/3 of the average particle size of the CBN.

6. A CBN cutting tool according to claim 1 wherein the refractory compound has an average particle size of about 1.5 micrometers.

7. A CBN cutting tool according to claim 1 wherein the infiltrant is derived from a silicon-aluminum eutectic composition.

8. A CBN cutting tool according to claim 1 wherein the infiltrant is present in the range of from about 2 to 10% by volume.

9. A CBN cutting tool according to claim 1 wherein the refractory compound is titanium aluminum carbonitride.

10. A CBN cutting tool according to claim 9 wherein the proportion of carbon to nitrogen in the titanium aluminum carbonitride is approximately 50/50.

11. A CBN cutting tool according to claim 1 wherein the refractory compound is selected from the group consisting of titanium carbide and titanium nitride.

12. A CBN cutting tool comprising a body of polycrystalline cubic boron nitride having a crystal size in the range of from 10 to 17 micrometers comprising:

in the range of from 2 to 15% by weight of a material selected from the group of refractory compounds consisting of titanium diboride, aluminum diboride, titanium carbide, titanium nitride, titanium carbonitride, titanium aluminum carbonitride, and $(Ti_xM_y)CN$, wherein the alloying metal M may be one or more of silicon, chromium, cobalt, tungsten and tantalum and the proportion of alloying metal to titanium, y/x, is in tho range of from 0.05 to 0.3, the carbonitrides having a carbon to nitrogen proportion in the range of from 30 atomic percent carbon and 70 atomic percent nitrogen to 70 atomic percent carbon and 30 atomic percent nitrogen;

an infiltrant containing aluminum and/or silicon;

carbon more than stoichiometric with the silicon in the infiltrant for forming silicon carbide; and a balance of substantially CBN.

13. A CBN cutting tool according to claim 12 wherein the carbon is present in the range of from about 2 to 2.5 times the amount stoichiometric with silicon.

14. A CBN cutting tool comprising a body of polycrystalline cubic boron nitride having a crystal size in the range of from 10 to 17 micrometers comprising:

in the range of from 2 to 15% by weight of a material selected from the group of refractory compounds consisting of titanium diboride, aluminum diboride, titanium carbide, titanium nitride, titanium carbonitride, titanium aluminum carbonitride, and $(Ti_xM_y)CN$, wherein the alloying metal M may be one or more of silicon, chromium, cobalt, tungsten and tantalum and the proportion of alloying metal to titanium, y/x, is in the range of from 0.05 to 0.3, the carbonitrides having a carbon to nitrogen proportion in the range of from 30 atomic percent carbon and 70 atomic percent nitrogen to 70 atomic percent carbon and 30 atomic percent nitrogen;

an infiltrant containing aluminum and/or silicon;

diamond having an average particle size in the range of from about 0.5 to 1 micron; and a balance of substantially CBN.

15. A CBN cutting tool according to claim 14 wherein the diamond is present in the range of from about 0.5 to 5 percent by weight of the powder mixture.

16. A CBN cutting tool according to claim 14 further comprising a layer of thermally and chemically stable refractory material metallurgically bonded to the body of polycrystalline cubic boron nitride.

17. A CBN cutting tool according to claim 1 further comprising a layer of material selected from the group of materials consisting of TiC, TiN, TiCN, TiAlN, and TiAlCN metallurgically bonded to the body of polycrystalline cubic boron nitride.

18. A CBN cutting tool CBN cutting tool comprising a body of polycrystalline cubic boron nitride comprising:

in the range of from 85 to 98% by weight CBN having a crystal size in the range of from 10 to 17 micrometers and average crystal size of about 13 micrometers;

in the range of from 2 to 10% by weight of a refractory compound selected from the group consisting of titanium carbonitride and titanium aluminum carbonitride;

diamond having an average particle size in the range of from about 0.5 to 1 micron; and an infiltrant containing aluminum and/or silicon; and wherein the diamond is more than stoichiometric with the silicon in the infiltrant for forming silicon carbide.

19. A CBN cutting tool according to claim 18 wherein the diamond is present in the range of from about 2 to 2.5 times the amount stoichiometric with silicon.

20. A CBN cutting tool according to claim 18 wherein the refractory compound has an average particle size less than 1/3 of the average particle size of the CBN.

21. A CBN cutting tool according to claim 18 wherein the carbonitrides having a carbon to nitrogen proportion in the range of from 30 atomic percent carbon and 70 atomic percent nitrogen to 70 atomic percent carbon and 30 atomic percent nitrogen.

22. A CBN cutting tool comprising a body of polycrystalline cubic boron nitride comprising:

95% by weight CBN having a crystal size in the range of from 10 to 17 micrometers and average crystal size of about 13 micrometers;

5% by weight of titanium carbonitride having an average particle size of about 1.5 micrometers;

diamond having an average particle size in the range of from about 0.5 to 1 micron; and an infiltrant containing aluminum.

23. A CBN cutting tool according to claim 22 wherein the infiltrant is derived from an aluminum-silicon composition and the diamond is more than stoichiometric with the silicon in the infiltrant for forming silicon carbide.

24. A CBN cutting tool according to claim 22 wherein the diamond is present in the range of from about 2 to 2.5 times the amount stoichiometric with silicon.

25. A CBN cutting tool according to claim 22 further comprising a layer of thermally and chemically stable refractory material metallurgically bonded to the body of polycrystalline cubic boron nitride.

26. A CBN cutting tool comprising a body of polycrystalline cubic boron nitride having a crystal size in the range of from 10 micrometers to 17 micrometers and average crystal size of about 13 micrometers consisting essentially of:

in the range of from 2 to 10% by weight of a refractory compound selected from the group consisting of titanium diboride, aluminum diboride, titanium carbide, titanium nitride, titanium carbonitride and titanium aluminum carbonitride, such a carbonitride having a carbon to nitrogen proportion in the range of from 30 atomic percent carbon and 70 atomic percent nitrogen to 70 atomic percent carbon and 30 atomic percent nitrogen;

an infiltrant containing silicon and aluminum;

diamond having an average particle size in the range of from about 0.5 to 1 micron at least two times stoichiometric with the silicon in the infiltrant for forming silicon carbide;

a balance of CBN; and substantially free of cobalt.

27. A CBN cutting tool according to claim 26 wherein the refractory compound is present at 5% and is selected from the group consisting of titanium carbonitride and titanium aluminum carbonitride.

28. A CBN cutting tool according to claim 26 wherein the carbonitride has an average particle size of about 1.5 micrometers.

29. A CBN cutting tool according to claim 28 wherein the proportion of carbon to nitrogen in the carbonitride is approximately 50/50.

30. A CBN cutting tool according to claim 26 further comprising a layer of thermally and chemically stable refractory material metallurgically bonded to the body of polycrystalline cubic boron nitride.

* * * * *